(12) United States Patent
Wang et al.

(10) Patent No.: US 11,950,048 B2
(45) Date of Patent: Apr. 2, 2024

(54) SOUND ABSORPTION MATERIAL, METHOD OF MAKING THE SAME AND SPEAKER BOX FILLED WITH THE SAME

(71) Applicant: AAC Microtech (Changzhou) Co., Ltd., Changzhou (CN)

(72) Inventors: Zhongyang Wang, Shenzhen (CN); Hezhi Wang, Shenzhen (CN); Jie Zhang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 184 days.

(21) Appl. No.: 17/741,493

(22) Filed: May 11, 2022

(65) Prior Publication Data

US 2023/0239612 A1 Jul. 27, 2023

(30) Foreign Application Priority Data

Jan. 25, 2022 (CN) .......................... 202210086719.6

(51) Int. Cl.
| | | |
|---|---|---|
| *H04R 1/28* | (2006.01) | |
| *C08J 7/04* | (2020.01) | |
| *C08J 9/36* | (2006.01) | |
| *C09D 7/40* | (2018.01) | |
| *C09D 7/43* | (2018.01) | |
| *C09D 7/61* | (2018.01) | |
| *C09D 7/65* | (2018.01) | |
| *C09D 125/18* | (2006.01) | |
| *C09D 133/04* | (2006.01) | |
| *G10K 11/162* | (2006.01) | |
| *H04R 1/02* | (2006.01) | |

(52) U.S. Cl.
CPC .......... *H04R 1/288* (2013.01); *C08J 7/0427* (2020.01); *C08J 9/365* (2013.01); *C09D 7/43* (2018.01); *C09D 7/61* (2018.01); *C09D 7/65* (2018.01); *C09D 7/66* (2018.01); *C09D 125/18* (2013.01); *C09D 133/04* (2013.01); *G10K 11/162* (2013.01); *H04R 1/025* (2013.01); *C08J 2367/02* (2013.01); *C08J 2375/04* (2013.01); *C08J 2379/02* (2013.01); *C08J 2425/18* (2013.01); *C08J 2433/04* (2013.01)

(58) Field of Classification Search
CPC ...... H04R 1/2803; H04R 1/288; H04R 1/025; G10K 11/162; G10K 11/165; C08J 7/0427; C08J 9/365; C08J 2367/02; C08J 2375/04; C08J 2379/02; C08J 2425/18; C08J 2433/04; C09D 7/43; C09D 7/65; C09D 7/66; C09D 125/18; C09D 133/04; C09D 7/61
See application file for complete search history.

(56) References Cited

U.S. PATENT DOCUMENTS

| | | | |
|---|---|---|---|
| 8,794,373 B1* | 8/2014 | Lin .................. | H04R 1/288 |
| | | | 381/345 |
| 2020/0152165 A1* | 5/2020 | Gavryushin ......... | G10K 11/002 |
| 2021/0144465 A1* | 5/2021 | Sauer ................... | H04R 1/288 |

* cited by examiner

*Primary Examiner* — Tuan D Nguyen
(74) *Attorney, Agent, or Firm* — W&G Law Group

(57) ABSTRACT

The present invention discloses a sound absorption material including an organic frame material; a binder; a thickener; and a plurality of sound absorption grains attached to the organic frame material via the binder, having a grain size in a range of 10-100 μm. The stability and the sound absorption performance of the sound absorption material have been effectively improved.

10 Claims, 2 Drawing Sheets

SOUND ABSORPTION MATERIAL, METHOD OF MAKING THE SAME AND SPEAKER BOX FILLED WITH THE SAME

FIELD OF THE PRESENT INVENTION

The present invention relates to acoustic material, especially relates to a sound absorption material applied in speaker box, a method of making the same, and a speaker box filled with the same.

DESCRIPTION OF RELATED ART

With the continuous development of the smart mobile terminals, lightening and thinning has become a trend, thus decreasing a volume of a back cavity of a speaker box mounted in the mobile terminals. Generally, the low frequency response would be significantly reduced with the volume reduction of the back cavity, resulting in poor acoustic quality. To solve this problem, a sound absorption material for absorbing sound is usually filled in the back cavity of the speaker box, virtually increasing the volume of the back cavity and improving the acoustic quality.

In related art, two types of the sound absorption material are commonly used. The first one is granular sound absorption material, which has a characteristic that the smaller the grain size, the higher the sound absorption performance. However, the granular sound absorption material is difficult to fully fill the back cavity; and its obvious grain vibration may result in poor acoustic quality. It may also enter the speaker resulting in damage of the speaker. The second one is clump sound absorption material with foam as a skeleton, having disadvantages such as agglomeration, poor air permeability, high sound resistance, and low sound absorption performance.

Therefore, it is necessary to provide an improved sound absorption material to overcome the problems mentioned above.

SUMMARY OF THE PRESENT INVENTION

The main purpose of the present invention is to provide a sound absorption material with higher stability and higher sound absorption performance.

To achieve the object mentioned above, the present invention provides a sound absorption material including: an organic frame material; a binder; a thickener; and a plurality of sound absorption grains attached to the organic frame material via the binder, having a grain size in a range of 10-100 μm.

Further, the sound absorption grain is composed of a plurality of sound absorption particles having a particle size less than 10 μm; the sound absorption particle is chosen from zeolite and active carbon.

Further, the zeolite comprises at least one of MFI, MEL and FER.

Further, the organic frame material has a two-dimensional structure and has a thickness in a range of 10-100 μm; the organic frame material is chosen from PE, PP, PVC and PET film.

Further, the organic frame material has a three-dimensional structure, chosen from melamine foam, polyurethane foam and polyethylene foam.

Further, the organic frame material has a density in a range of 1-10 mg/cm3 and porosity more than 50%, comprising a plurality of through holes having an average diameter in a range of 50-300 μm.

Further, a weight ratio of the binder in the sound absorption material is in a range of 2-10%; the binder comprises at least one of polyacrylate, polystyrene acrylate, polystyrene acetate, and polyethyl vinyl acetate salt.

Further, a weight ratio of the thickener in the sound absorption material is in a range of 0.5-2%; the thickener comprises at least one of sodium alginate, sodium hydroxymethyl cellulose, and polyvinyl alcohol.

The present invention further provides a method of preparing the sound absorption material as described above, including steps:

sintering or bonding the sound absorption particles and then obtain the sound absorption grains having a grain size in a range of 10-100 μm by extrusion-spheronization pelletizing technology or spray granulation technology;

mixing the sound absorption grains, the binder and the thickener to obtain a slurry; and immersing the organic frame material in the slurry and drying the slurry after standing for 5-20 mins to obtain the sound absorption material.

The present invention also provides a speaker box, including: a housing having a receiving space; a speaker received in the receiving space, enclosing a back cavity with the housing; and the sound absorption material as described above filled in the back cavity.

BRIEF DESCRIPTION OF THE DRAWINGS

The present invention will hereinafter be described in detail with reference to an exemplary embodiment. To make the technical problems to be solved, technical solutions and beneficial effects of present invention more apparent, the present invention is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

It should be noted that the description of "first", "second" and the like in the present invention is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the various embodiments can be combined with each other, but it must be based on that it can be realized by ordinary technicians. When the combination of the technical solutions is contradictory or cannot be realized, it should be considered that the combination of the technical solutions does not exist, nor is it within the scope of protection required by the present invention.

A sound absorption material 100 provided by an exemplary embodiment of the present invention includes an organic frame material, a binder, a thickener, and a plurality of sound absorption grains attached to the organic frame material via the binder. The sound absorption grain has a grain size in a range of 10-100 μm.

Figure 2:
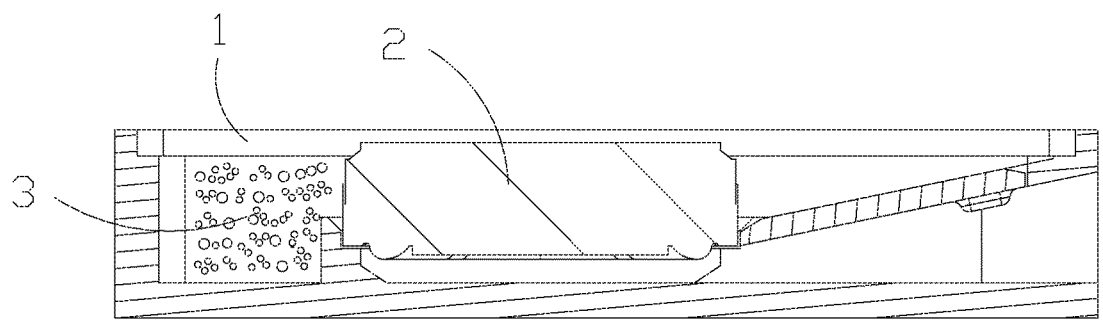
FIG. 2 is a cross-sectional view of a speaker box filled with the sound absorption material of the present invention.

As shown in FIG. 2, a speaker box 100 is further provided in the present invention. The speaker box 100 includes a housing 1 having a receiving space, a speaker 2 received in the receiving space and enclosing a back cavity 3 with the housing 1, and the sound absorption material as described above filled in the back cavity 3. The sound absorption material can increase the acoustic compliance of the air in the back cavity 3 and improve the low frequency acoustic performance of the speaker box 100.

Specifically, the sound absorption grain is composed of a plurality of sound absorption particles having a particle size less than 10 μm. The sound absorption particle is chosen from zeolite and active carbon. Furthermore, the zeolite includes at least one of MFI, MEL and FER. It should be noted that the zeolite with pure phase and mixed phase both have excellent sound absorption property even though the zeolites differ in hole structure.

Furthermore, the organic frame material has a two-dimensional structure. Based on the two-dimensional structure, the organic frame material is chosen from PE, PP, PVC and PET film. A thickness of the organic frame material in a range of 10-100 μm is more beneficial to serve as a supporting frame. In order to bear more sound absorption grains uniformly, a three-dimensional structure organic frame material could be chosen.

Specifically, the organic frame material is chosen melamine foam, polyurethane foam and polyethylene foam. Compared with the two-dimensional structure, the external surface and the internal holes of the organic frame material with three-dimensional structure make greater contribution to attach more sound absorption grains, further improving the sound absorption ability of the sound absorption material. In the present invention, the organic frame material has a density in a range of 1-10 mg/cm3 and porosity more than 50%. For bearing more sound absorption grains, the organic frame material includes a plurality of through holes having an average diameter in a range of 50-300 μm.

Besides, the binder includes at least one of polyacrylate, polystyrene acrylate, polystyrene acetate, and polyethyl vinyl acetate salt. A weight ratio of the binder in the sound absorption material is in a range of 2-10%, effectively protecting the sound absorption grains from dropping off and improving the bond strength between the sound absorption grains and the organic frame material.

Besides, the thickener includes at least one of sodium alginate, sodium hydroxymethyl cellulose, and polyvinyl alcohol. A weight ratio of the thickener in the sound absorption material is in a range of 0.5-2%.

Figure 1:
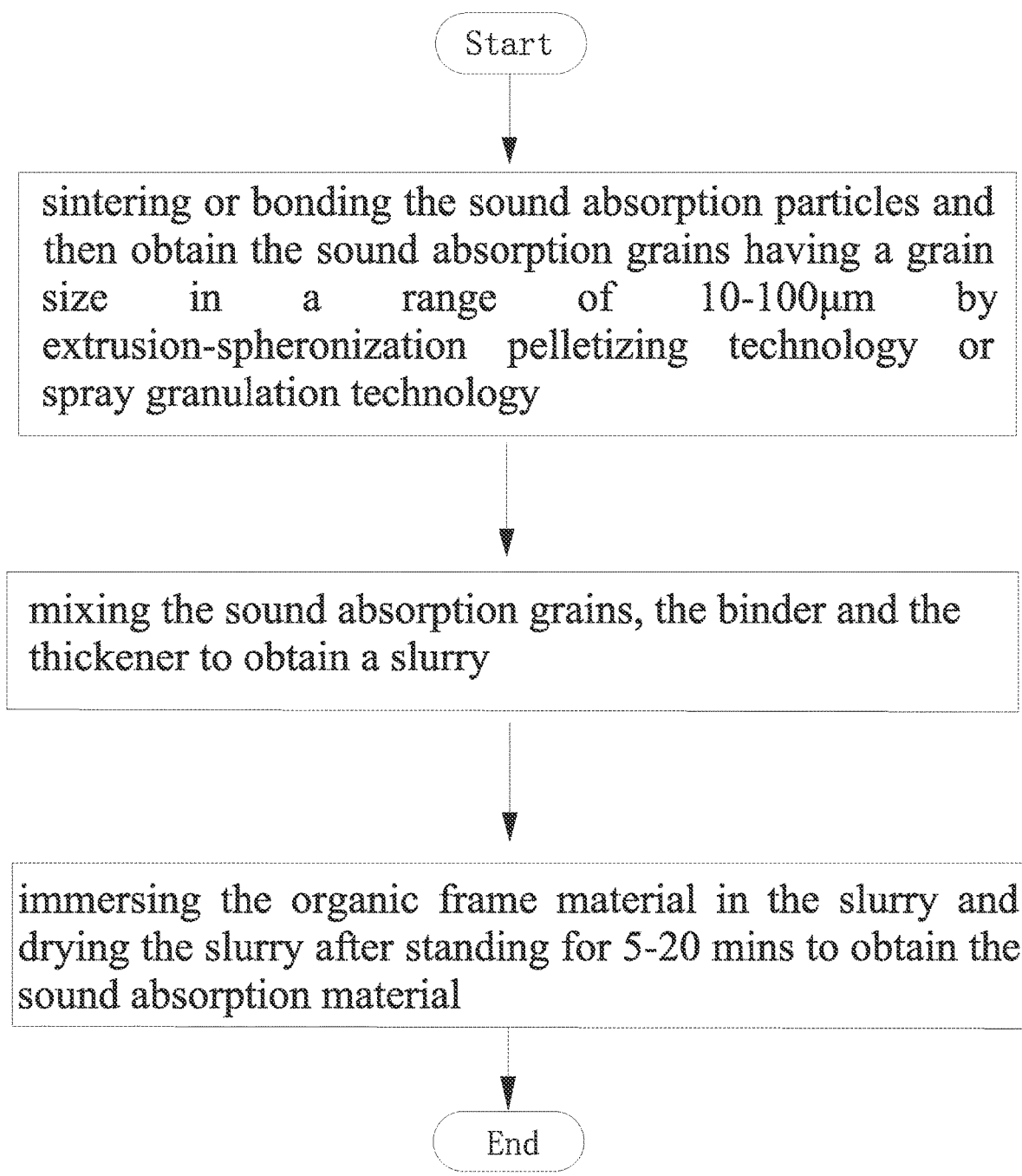
FIG. 1 is a flow chart of a method of preparing a sound absorption material in accordance with an exemplary embodiment of the present invention.

A method of preparing the sound absorption material is provided in the present invention. Please refer to FIG. 1 to describe the method.

The method including following steps:
Step 1: sintering or bonding the sound absorption particles and then obtain the sound absorption grains having a grain size in a range of 10-100 μm by extrusion-spheronization pelletizing technology or spray granulation technology.
Step 2: mixing the sound absorption grains, the binder and the thickener to obtain a slurry.
Step 3: immersing the organic frame material in the slurry and drying the slurry after standing for 5-20 mins to obtain the sound absorption material.

In step 3, the slurry is dried in an oven under a temperature about 100° C.

The implementation of the present invention will be explained below in conjunction with specific Embodiments.

Embodiment 1

A sound absorption material is prepared by the method as follows:
Weigh 50 wt % zeolite, 45 wt % water and 5 wt % polystyrene acrylate and mix them uniformly to prepare sound absorption grains by extrusion-spheronization pelletizing technology. Specifically, after granulation, a sieve of 150-300 mesh is configured to obtain the sound absorption grains having a grain size in a range of 50-100 μm.

Weigh 1 wt % polystyrene acrylate, 0.2 wt % sodium hydroxymethyl cellulose, 50 wt % deionized water, and 5 wt % ethanol and mix then uniformly to obtain a mixture; add 50 wt % the prepared sound absorption grains into the mixture; stir for 30 mins to disperse the sound absorption grains into the mixture uniformly to obtain a slurry.

Immerse a PET film with a thickness of 25 μm in the slurry and stand for 5 mins; dry the slurry in an oven under 110° C. to obtain the sound absorption material.

Embodiment 2

A sound absorption material is prepared by the method as follows:
Weigh 50 wt % zeolite, 45 wt % water and 5 wt % polystyrene acrylate and mix them uniformly to prepare sound absorption grains by extrusion-spheronization pelletizing technology. Specifically, after granulation, a sieve of 150-300 mesh is configured to obtain the sound absorption grains having a grain size in a range of 50-100 μm.

Weigh 1 wt % polystyrene acrylate, 0.2 wt % sodium hydroxymethyl cellulose, 50 wt % deionized water, and 5 wt % ethanol and mix then uniformly to obtain a mixture; add 40 wt % the prepared sound absorption grains into the mixture; stir for 30 mins to disperse the sound absorption grains into the mixture uniformly to obtain a slurry.

Immerse a melamine foam having a density of 5 mg/cm3 and having holes with an average diameter in a range of 100-200 μm in the slurry and stand for 5 mins; dry the slurry in an oven under 110° C. to obtain the sound absorption material.

Embodiment 3

A sound absorption material is prepared by the method as follows:
Weigh 50 wt % zeolite, 40 wt % water, 5 wt % polyacrylate and 5 wt % hydrogen peroxide and mix them uniformly to prepare sound absorption grains by spray granulation technology. Specifically, after granulation, a sieve of 150-300 mesh is configured to obtain the sound absorption grains having a grain size in a range of 50-100 μm.

Weigh 3 wt % polyacrylate, 0.1 wt % polyvinyl alcohol, 50 wt % deionized water, and 5 wt % ethanol and mix then uniformly to obtain a mixture; add 40 wt % the prepared sound absorption grains into the mixture; stir for 30 mins to disperse the sound absorption grains into the mixture uniformly to obtain a slurry.

Immerse a melamine foam having a density of 5 mg/cm3 and having holes with an average diameter in a range of 100-200 μm in the slurry and stand for 10 mins; dry the slurry in an oven under a temperature more than 100° C. to obtain the sound absorption material.

Embodiment 4

A sound absorption material is prepared by the method as follows:

Weigh 50 wt % zeolite, 40 wt % water, 5 wt % butyl benzene emulsion and 5 wt % hydrogen peroxide and mix them uniformly to prepare sound absorption grains by extrusion-spheronization pelletizing technology. Specifically, after granulation, a sieve of 150-300 mesh is configured to obtain the sound absorption grains having a grain size in a range of 50-100 μm.

Weigh 2 wt % butyl benzene emulsion, 0.2 wt % sodium hydroxymethyl cellulose, 50 wt % deionized water, and 5 wt % ethanol and mix then uniformly to obtain a mixture; add 20 wt % the prepared sound absorption grains into the mixture; stir for 30 mins to disperse the sound absorption grains into the mixture uniformly to obtain a slurry.

Immerse a polyurethane foam having a density of 3 mg/cm3 and having holes with an average diameter in a range of 200-300 μm in the slurry and stand for 5 mins; dry the slurry in an oven under 110° C. to obtain the sound absorption material.

Embodiment 5

A sound absorption material is prepared by the method as follows:

Weigh 50 wt % active carbon, 40 wt % water, 5 wt % polyacrylate and 5 wt % hydrogen peroxide and mix them uniformly to prepare sound absorption grains by spray granulation technology. Specifically, after granulation, a sieve of 150-300 mesh is configured to obtain the sound absorption grains having a grain size in a range of 50-100 μm.

Weigh 1 wt % polyacrylate, 0.1 wt % polyvinyl alcohol, 50 wt % deionized water, and 5 wt % ethanol and mix then uniformly to obtain a mixture; add 40 wt % the prepared sound absorption grains into the mixture; stir for 30 mins to disperse the sound absorption grains into the mixture uniformly to obtain a slurry.

Immerse a melamine foam having a density of 7 mg/cm3 and having holes with an average diameter in a range of 100-200 μm in the slurry and stand for 5 mins; dry the slurry in an oven under 110° C. to obtain the sound absorption material.

Besides, in order to verify the effect of the sound absorption material prepared by the method of the present invention, two comparative examples are also provided as follows.

Comparative Example 1

Weigh 50 wt % zeolite, 40 wt % water, and 5 wt % polystyrene acrylate and mix them uniformly to prepare sound absorption grains by extrusion-spheronization pelletizing technology. Specifically, after granulation, a sieve of 60-150 mesh is configured to obtain the sound absorption grains having a grain size in a range of 100-250 μm.

Weigh 2 wt % polystyrene acrylate, 0.2 wt % sodium hydroxymethyl cellulose, 50 wt % deionized water, and 5 wt % ethanol and mix then uniformly to obtain a mixture; add 40 wt % the prepared sound absorption grains into the mixture; stir for 30 mins to disperse the sound absorption grains into the mixture uniformly to obtain a slurry.

Immerse a melamine foam having a density of 5 mg/cm3 and having holes with an average diameter in a range of 100-200 μm in the slurry and stand for 5 mins; dry the slurry in an oven under 110° C. to obtain the sound absorption material.

Comparative Example 2

Weigh 50 wt % zeolite, 40 wt % water, and 5 wt % polystyrene acrylate and mix them uniformly to prepare sound absorption grains by spray granulation technology. Specifically, after granulation, a sieve of 150-300 mesh is configured to obtain the sound absorption grains having a grain size in a range of 50-100 μm.

Weigh 4 wt % polystyrene acrylate, 0.2 wt % polyvinyl alcohol, 50 wt % deionized water, and 5 wt % ethanol and mix then uniformly to obtain a mixture; add 40 wt % the prepared sound absorption grains into the mixture; stir for 30 mins to disperse the sound absorption grains into the mixture uniformly to obtain a slurry.

Immerse a melamine foam having a density of 10 mg/cm3 and having holes with an average diameter in a range of 50-100 μm in the slurry and stand for 5 mins; dry the slurry in an oven under 110° C. to obtain the sound absorption material.

Acoustic performance tests are carried out on the sound absorption materials prepared in embodiments 1-5 and comparative Examples 1-2 of the present invention, as well as common sound absorption material sample in the field. The test data are shown in the Table 1 below.

TABLE 1

Data of acoustic performance test

| Sample | Reduction of resonance frequency Δ F0 (Hz) |
|---|---|
| Embodiment 1 | 119 |
| Embodiment 2 | 126 |
| Embodiment 3 | 132 |
| Embodiment 4 | 114 |
| Embodiment 5 | 109 |
| Comparative example 1 | 32 |
| Comparative example 2 | 46 |
| Common sound absorption material | 106 |

As shown in Table 1, under condition of same acoustic fill volume, the acoustic performance of the sound absorption materials prepared in embodiments 1-5 are significantly better compared with the common sound absorption material, thus improving the low frequency performance of the speaker box 100 filled with the sound absorption material provided in the present invention. Furthermore, the acoustic performance of the sound absorption material in the present invention is relatively stable because of the high bond strength between the sound absorption grains and the organic frame material. Moreover, the organic frame material as a carrier could be adjusted according to shape of the back cavity 3 of the speaker box 100 to fill the back cavity 3 to maximum, further improving the low frequency performance of the speaker box 100. Besides, during the assembly process of the speaker box, the sound absorption material block can be easily put into the back cavity, thus eliminating the step of filling and improving the preparation efficiency of the speaker box.

The acoustic performance of the sound absorption material in comparative examples is obviously worse than that of the embodiments 1-5. This is caused by the mismatch size of the grain size of the sound absorption grains and the average diameter of the holes in the three dimensional foam. During the preparation of the sound absorption material, the sound absorption grains attach on the external surface of the organic frame material, not the internal holes.

In embodiment 1, the PET film as an organic frame material is a two dimensional structure, effectively increasing the specific surface area of the sound absorption grains and improving the acoustic performance compared with the comparative examples 1-2.

Compared with the related art, in the embodiments of the present invention, the sound absorption material includes an organic frame material, a binder, a thickener and a plurality of sound absorption grains. The sound absorption grains having a grain size in a range of 10-100 μm attach to the organic frame material via the binder. The excellent acoustic performance of the small size sound absorption grains is at mostly utilized to meet the miniaturization trend of the speaker box. Furthermore, the integration of the sound absorption grains and the organic frame material effectively improves the stability of the sound absorption material in the back cavity of the speaker box, avoiding acoustic performance reduction caused by the grain vibration and also avoiding the sound absorption material entering the speaker. Moreover, the sound absorption material provided in the present invention adapts to back cavities with different shapes, eliminating the step of filling and improving the preparation efficiency of the speaker box.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound absorption material comprising:
    an organic frame material;
    a binder;
    a thickener; and
    a plurality of sound absorption grains attached to the organic frame material via the binder, having a grain size in a range of 10-100 μm.

2. The sound absorption material as described in claim 1, wherein the sound absorption grain is composed of a plurality of sound absorption particles having a particle size less than 10 μm; the sound absorption particle is chosen from zeolite and active carbon.

3. The sound absorption material as described in claim 2, wherein the zeolite comprises at least one of MFI, MEL and FER.

4. The sound absorption material as described in claim 1, wherein the organic frame material has a two-dimensional structure and has a thickness in a range of 10-100 μm; the organic frame material is chosen from PE, PP, PVC and PET film.

5. The sound absorption material as described in claim 1, wherein the organic frame material has a three-dimensional structure, chosen from melamine foam, polyurethane foam and polyethylene foam.

6. The sound absorption material as described in claim 5, wherein the organic frame material has a density in a range of 1-10 mg/cm3 and porosity more than 50%, comprising a plurality of through holes having an average diameter in a range of 50-300 μm.

7. The sound absorption material as described in claim 1, wherein a weight ratio of the binder in the sound absorption material is in a range of 2-10%; the binder comprises at least one of polyacrylate, polystyrene acrylate, polystyrene acetate, and polyethyl vinyl acetate salt.

8. The sound absorption material as described in claim 1, wherein a weight ratio of the thickener in the sound absorption material is in a range of 0.5-2%; the thickener comprises at least one of sodium alginate, sodium hydroxymethyl cellulose, and polyvinyl alcohol.

9. A method of preparing the sound absorption material as described in claim 1, comprising steps:
    sintering or bonding the sound absorption particles and then obtain the sound absorption grains having a grain size in a range of 10-100 μm by extrusion-spheronization pelletizing technology or spray granulation technology;
    mixing the sound absorption grains, the binder and the thickener to obtain a slurry; and
    immersing the organic frame material in the slurry and drying the slurry after standing for 5-20 mins to obtain the sound absorption material.

10. A speaker box, comprising:
    a housing having a receiving space;
    a speaker received in the receiving space, enclosing a back cavity with the housing; and
    the sound absorption material as described in claim 1 filled in the back cavity.

* * * * *